United States Patent Office 3,201,406
Patented Aug. 17, 1965

3,201,406
PYRIDYLCOUMARINS
Robert B. Moffett, Kalamazoo, Mich., assignor to The Upjohn Company, Kalamazoo, Mich., a corporation of Delaware
No Drawing. Filed Feb. 11, 1963, Ser. No. 257,766
7 Claims. (Cl. 260—295)

This invention pertains to novel organic chemical compounds, and to a process for preparing the same. More particularly, the invention is directed to novel 3-(pyridyl)- and 4-(pyridyl)coumarins which, in their free base form, are represented by the following structural formula

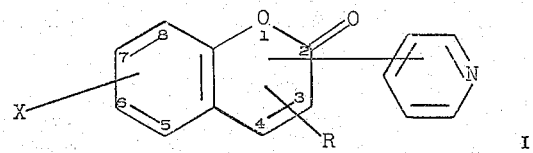

wherein R is selected from the group consisting of hydrogen, alkyl of from 1 to 4 carbon atoms, inclusive, and phenyl; and X is selected from the group consisting of nitro, amino, and acetamido.

The novel free base compounds of Formula I form acid addition salts with acids, which acid addition salts are contemplated as an embodiment of the invention. Likewise, novel N-oxides of the nitro and acetamido free base compounds are contemplated as an embodiment of the invention.

The novel free bases (compounds of Formula I, above), acid addition salts, and N-oxides of this invention are useful chemical compounds. They exhibit pharmacologic activity as central nervous system depressants and are useful to effect sedation in mammals, birds, and other animals when administered orally or parenterally. The compounds are also useful as ultraviolet screening agents and as optical brightening agents for textiles.

The novel 3-(pyridyl)- and 4-(pyridyl)coumarins of this invention are prepared by condensing a 2-hydroxyphenyl ketone or a 2-hydroxybenzaldehyde (i.e., a salicylaldehyde) of the formula

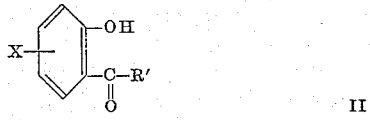

wherein X is nitro or acetamido and R' is selected from the group consisting of hydrogen, alkyl (as defined above), phenyl, and pyridyl, with an acetic acid of the formula R''—$CH_2$—COOH (III) (or ester or anhydride thereof), wherein R'' is selected from the group consisting of hydrogen, alkyl (as defined above), phenyl, and pyridyl.

The condensation reaction is basically a variation of the Perkin reaction as described in Organic Reactions, vol. I, pp. 210–265, John Wiley and Sons, Inc., New York (1942). The reaction can be effected with the anhydride of the acid (Formula III, above) in the presence of a basic catalyst. Illustratively, the anhydride of a pyridinacetic acid is generated in situ by employing 1 to 6 moles of acetic anhydride for each mole of pyridineacetic acid employed in the reaction. Phenylacetic anhydride can be generated in the same way. When R'' (Formula III, above) is hydrogen or alkyl the alkanoic acid and its anhydride can be used together. Suitable basic catalysts include basic amines and salts of alkali metals. Tertiary amines are preferred, for example, triethylamine, N-methylpiperidine, N-methylmorpholine, and the like. Suitable alkali metal salts include, for example, sodium carbonate, potassium carbonate, sodium acetate, potassium acetate, sodium propionate, and the like.

When a salicylaldehyde (i.e., a compound of Formula II in which R' is hydrogen) is employed, an ester of the acid (Formula III, above, wherein R'' is pyridyl) can be used in the condensation. Suitable esters include loweralkyl esters, for example, methyl, ethyl, and like esters. Accordingly, nitrosalicylaldehydes and acetamidosalicylaldehydes within the scope of Formula II can be condensed with lower-alkyl pyridineacetates, for example, methyl 2-pyridineacetate, ethyl 3-pyridineacetate, and methyl 4-pyridineacetate, to obtain 3-(2-, 3-, and 4-pyridyl)coumarins according to Formula I wherein R is hydrogen. Piperidine, morpholine, and the like are suitable basic catalysts when esters are used.

In accordance with the general reaction of compounds of Formula II with an acid of Formula III in the presence of a basic catalyst stoichiometric proportions of the reactants are ordinarily employed, but if desired greater or less than stoichiometric proportions of either reactant can be used. When an alkanoic anhydride is employed with a pyridine- or phenylacetic acid as described, the alkanoic anhydride is advantageously present in excess. The basic catalyst is preferably employed in about a stoichiometrically equivalent amount.

The condensation reaction proceeds over a wide range of temperatures. Any initial exothermic reaction can be followed by heating at temperatures between about 70° C. and about 200° C. in order to ensure completion of the reaction. In general, higher temperatures require less reaction time than lower temperatures.

The 3-(pyridyl)- and 4-(pyridyl)coumarins produced by the condensation reaction are recovered in accordance with conventional procedures such as evaporating the reaction medium and extracting or crystallizing the product. The compounds are substantially insoluble in water and the reaction mixture can be readily decomposed by pouring into ice water and recovering the insoluble portion. The crude product thus obtained can be further purified by well-known procedures for purifying organic compounds such as solvent extraction and crystallization, and by sublimation at reduced pressures.

The 3-(pyridyl)- and 4-(pyridyl)coumarins of Formula I wherein X is amino ($NH_2$) are obtained by hydrogenation of the corresponding nitro compounds under mild conditions, i.e., conditions which will not reduce the 3:4 double bond of the coumarin nucleus. Advantageously, hydrogenation is effected with a catalyst, e.g., ruthenium, Raney nickel, and like catalysts at hydrogen pressures of about atmospheric to about 80 lbs., and at temperatures below about 40° C. Other mild conditions of hydrogenation will be apparent to those skilled in the art.

The amino compounds thus obtained can be converted to the corresponding 3-(pyridyl)- and 4-(pyridyl)coumarins of Formula I wherein X is acetamido by reaction with an acetylating agent, e.g., acetic anhydride.

Novel acid addition salts of the free base compounds of Formula I above are prepared by acidifying the free base in aqueous medium with a desired acid, illustratively, a pharmacologically acceptable organic or inorganic acid, for example, hydrochloric, hydrobromic, sulfuric, phosphoric, tartaric, citric, acetic, succinic, and like acids. Salts of these and even toxic acids are useful in purifying the free bases.

The free base compounds of Formula I can be reacted with fluosilicic acid to form fluosilicate salts in accordance with U.S. Patents 1,915,334 and 2,075,359. The amine fluosilicate salts thus obtained are effective as moth-proofing agents. The compounds can also be used in accordance with U.S. Patents 2,425,320 and 2,606,155 to form amine thiocyanate-formaldehyde condensation products for use as pickling inhibitors.

The novel N-oxides of the novel nitro and acetamido 3-(pyridyl)- and 4-(pyridyl)coumarins of this invention are prepared by reacting a nitro or acetamido 3-(pyridyl)- or 4-(pyridyl)coumarin with a peroxidizing agent, for example, hydrogen peroxide, perbenzoic acid, perphthalic acid, peracetic acid, persulfuric acid, and permonosulfuric acid (Caro's acid). The reaction is advantageously carried out in a solvent, illustratively, glacial acetic acid, aqueous acetic acid, ethanol, and aqueous ethanol. The reaction proceeds satisfactorily at about 70° C.; however, higher or lower temperatures can be used. The N-oxides are separated from the reaction mixture and recovered in pure form by conventional procedures such as filtration, solvent evaporation, solvent extraction, and crystallization.

The following examples are illustrative of the process and products of the present invention, but are not to be construed as limiting.

EXAMPLE 1.—PREPARATION OF 6-ACETAMIDO- 3-(4-PYRIDYL)COUMARIN

*Part A.—6-nitro-3-(4-pyridyl)coumarin*

A solution consisting of 40.0 g. (0.24 mole) of 5-nitrosalicylaldehyde, 30.2 g. (0.2 mole) of methyl 4-pyridineacetate, and 11.6 ml. (10 g.) of piperidine in 250 ml. of absolute ethanol was heated under reflux, with stirring, for 1¾ hrs. After heating for about 5 minutes, crystals began to separate. After cooling, the crystals were collected on a filter, washed with ethanol, and dried. There was thus obtained 43.0 g. (80% yield) of 6-nitro-3-(4-pyridyl)coumarin as a tan solid having a melting point of 263.5° to 265.5° C. After recrystallization from 300 ml. of dimethylformamide there was obtained 40.0 g. (75% yield) of the pure compound as nearly white needles having a melting point of 270° to 271° C.

*Analysis.*—Calcd. for $C_{14}H_8N_2O_4$: C, 62.69; H, 3.00; N, 10.44; O, 23.86. Found: C, 62.62; H, 3.13; N, 10.22; O, 23.78.

*Part B.—6-amino-3-(4-pyridyl)coumarin*

A suspension of 11.12 g. (0.0415 mole) of 6-nitro-3-(4-pyridyl)coumarin (Part A, above) in 150 ml. of ethanol was hydrogenated (in a Parr hydrogenator) at 60 lbs. initial hydrogen pressure and about 25° C. in the presence of two teaspoonfuls of moist Raney nickel catalyst. The theoretical 0.125 mole of hydrogen was absorbed in about 1 hr. after which the hydrogen pressure remained nearly steady. After cooling the reaction mixture in a refrigerator the solids were collected on a filter and washed repeatedly with hot dimethylformamide (a total volume of 180 ml. was used). The dimethylformamide wash solution was diluted to a volume of 500 ml. with absolute ethanol, cooled, and filtered. There was thus obtained 5.93 g. of 6-amino-3-(4-pyridyl)coumarin as a yellow solid, having a melting point of 253° to 255° C. After concentrating the filtrate and again diluting with ethanol there was obtained another 3.0 g. of product having a melting point of 253° to 255.5° C. The total yield of 6-amino-3-(4-pyridyl)coumarin was 90.4%. A small sample was sublimed at about 220° C. and 0.005 mm. of mercury pressure which, when recrystallized from methanol, had a melting point of 255° to 257° C.

*Analysis.*—Calcd. for $C_{14}H_{10}N_2O_2$: C, 70.58; H, 4.23; N, 11.76. Found: C, 70.59; H, 4.05; N, 11.75.

*Part C.—6-actamido-3-(4-pyridyl)coumarin*

A solution consisting of 6.2 g. (0.026 mole) of 6-amino-3-(4-pyridyl)coumarin (Part B, above), 150 ml. of acetic anhydride, and 50 ml. of acetic acid was heated at the boiling temperature for a few minutes, filtered, and cooled. The yellow crystals which formed during cooling were collected on a filter, washed first with acetic anhydride and then with ethanol, and dried. There was thus obtained 5.0 g. (68.6% yield) of 6-acetamido-3-(4-pyridyl)coumarin as a yellow solid having a melting point of 298° to 300° C. On recrystallizing a small sample from methyl Cellosolve (monomethyl ether of ethylene gylcol) the melting point was not changed.

*Analysis.*—Calcd. for $C_{16}H_{12}N_2O_3$: C, 68.56; H, 4.32; N, 9.99. Found: C, 68.28; H, 4.39; N, 9.89.

Following the above procedure, but substituting ethyl 3-pyridineacetate for methyl 4-pyridineacetate, there can be prepared 6-nitro-3-(3-pyridyl)coumarin, 6-amino-3-(3-pyridyl)-coumarin, and 6-acetamido-3-(3-pyridyl)coumarin.

EXAMPLE 2.—PREPARATION OF 6-ACETAMIDO- 3-(2-PYRIDYL)COUMARIN

*Part A.—6-nitro-3-(2-prridyl)coumarin*

A solution consisting of 30.0 g. (0.18 mole) of 5-nitrosalicylaldehyde, 22.5 g. (0.15 mole) of methyl 2-pyridinacetate, 8.7 ml. (7.5 g.) of piperidine, and 150 ml. of absolute ethanol was heated at the reflux temperature with stirring for 1 hr. After about 10 min. heating, a solid began to separate. The reaction mixture was cooled and the solid was collected on a filter, washed with ethanol, and dried. There was thus obtained 25.5 g. (63.5% yield) of 6-nitro-3-(2-pyridyl)coumarin as a tan solid having a melting point of 214.5° to 215.5° C. After recrystallization from 150 ml. of dimethylformamide there was obtained 23.7 g. of the compound as light yellow-tan crystals having a melting point of 215° to 216.5° C.

*Anaylsis.*—Calcd. for $C_{14}H_8N_2O_4$: C, 62.69; H, 3.00; N, 10.44; O, 23.36. Found: C, 62.84; H, 2.85; N, 10.38; O, 23.04.

*Part B.—6-amino-3-(2-pyridyl)coumarin*

Following the procedure of Example 1, Part B, but substituting 6-nitro-3-(2-pyridyl)coumarin for 6-nitro-3-(4-pyridyl)coumarin, there can be prepared 6-amino-3-(2-pyridyl)coumarin.

*Part C.—6-acetamido-3-(2-pyridyl)coumarin*

Following the procedure of Example 1, Part C, but substituting 6-amino-3-(2-pyridyl)coumarin for 6-amino-3-(4-pyridyl)coumarin, there can be prepared 6-acetamido-3-(2-pyridyl)coumarin.

EXAMPLE 3.—PREPARATION OF 6-AMINO-3-(4- PYRIDYL)COUMARIN HYDROCHLORIDE 6-amino-3-(4-pyridyl)coumarin hydrochloride can be prepared as follows: 6-amino-3-(4-pyridyl)coumarin (Example 1, Part B) is dissolved, with gentle heating, in dilute hydrochloric acid. The solution is evaporated under reduced pressure at about 35° C. to obtain 6-amino-3-(4-pyridyl)coumarin hydrochloride.

EXAMPLE 4.—PREPARATION OF 6-ACETAMIDO- 3-(4-PYRIDYL)COUMARIN N-OXIDE 6-acetamido-3-(4-pyridyl)coumarin N-oxide can be prepared as follows: A solution of 6-acetamido-3-(4-pyridyl)coumarin (Example 1, Part C, above) and 30% hydrogen peroxide in glacial acetic acid is heated in a bath at 70° C. for about 16 hrs. The 6-acetamido-3-(4-pyridyl)coumarin N-oxide can be recovered by distillation of the solvent under reduced pressure.

PREPARATION 1.—2-HYDROXYPHENYL 3-PYRIDYL KETONE 2-hydroxyphenyl 3-pyridyl ketone can be prepared as follows: A mixture of 1 mole of phenyl nicotinate and 2 moles of anhydrous aluminum chloride is heated in an oil bath at a temperature of 150° C. for 15 minutes with stirring. After cooling, the reaction mixture is poured into ice water and the acidity adjusted to about pH 6 to 7. The mixture is extracted with chlorolorm. The chloroform is evaporated to obtain 2-hydroxyphenyl 3-pyridyl ketone.

PREPARATION 2.—2-HYDROXY-5-NITROPHENYL 3-PYRIDYL KETONE 2-hydroxy-5-nitrophenyl 3-pyridyl ketone can be prepared as follows: A mixture of 1 mole of 2-hydroxyphenyl 3-pyridyl ketone (Preparation 1, above) and a mixture of nitric acid and sulfuric acid is stirred in an ice-bath for about 16 hrs. The reaction mixture is then poured into ice water and the 2-hydroxy-5-nitrophenyl 3-pyridyl ketone is collected and purified by crystallization.

EXAMPLE 5.—PREPARATION OF 6-ACETAMIDO-3-PHENYL-4-(3-PYRIDYL)COUMARIN

Part A.—6-nitro-3-phenyl-4-(3-pyridyl)coumarin 6-nitro-3-phenyl-4-(3-pyridyl)coumarin can be prepared as follows: A mixture of 1 mole of 2-hydroxy-5-nitrophenyl 3-pyridyl ketone Preparation 2, above), 1 mole of phenylacetic acid, 6 moles of acetic anhyride, and 1 mole of triethylamine is heated in an oil bath at a temperature of 150° C. for 5 hrs. The reaction mixture is cooled and poured into water. The aqueous mixture is made slightly basic (pH about 8) with aqueous sodium hydroxide and the product is collected on a filter and washed with water. The filter cake is extracted with chloroform, and the chloroform is evaporated to obtain 6-nitro-3-phenyl-4-(3-pyridyl)coumarin.

Following the same procedure, but substituting propionic acid and propionic anhydride, butyric acid and butyric anhydride, isovaleric acid and isovaleric anhydride, and caproic acid and caproic anhydride for phenylacetic acid and acetic anhydride, there can be prepared 3-methyl-, 3-ethyl-, 3-isopropyl-, and 3-butyl-6-nitro-4-(3-pyridyl)coumarin, respectively.

Part B.—6-amino-3-phenyl-4(3-pyridyl)coumarin

Following the procedure of Example 1, Part B, but substituting 6-nitro-3-phenyl-4-(3-pyridyl)coumarin for 6-nitro-3-(4-pyridyl)coumarin, there can be prepared 6-amino-3-phenyl-4-(3-pyridyl)coumarin.

Part C.—6-acetamido-3-phenyl-4-(3-pyridyl)coumarin

Following the procedure of Example 1, Part C, but substituting 6-amino-3-phenyl-4-(3-pyridyl)coumarin for 6-amino-3-(4-pyridyl)coumarin, there can be prepared 6-acetamido-3-phenyl-4-(3-pyridyl)coumarin.

EXAMPLE 6.—PREPARATION OF 4-METHYL-7-NITRO-3-(3-PYRIDYL)COUMARIN 4-methyl-7-nitro-3-(3-pyridyl)coumarin can be prepared as follows: A solution of 0.1 mole of 2'-hydroxy-4'-nitro-acetophenone and 0.1 mole of 3-pyridineacetic acid in 0.3 mole of acetic anhydride and 0.1 mole of triethylamine is stirred at the reflux temperature for about 18 hrs. The reaction mixture is cooled, poured into ice water, and neutralized with aqueous sodium hydroxide solution. The mixture is extracted with chloroform and the extract is washed successively with aqueous sodium carbonate solution and water. The chloroform solution is evaporated to obtain 4-methyl-7-nitro-3-(3-pyridyl)-coumarin.

The 4-methyl-7-nitro-3-(3-pyridyl)coumarin can be catalytically hydrogenated by the procedure of Example 1, Part B, to obtain 7-amino-4-methyl-3-(3-pyridyl)coumarin, and the latter can be acetylated by the procedure of Example 1, Part C, to obtain 7-acetamido-4-methyl-3-(3-pyridyl)coumarin.

Following the same procedure, but substituting 2-hydroxyl-5-nitrobenzophenone for 2'-hydroxy-4'-nitroactophenone, there can be prepared 6-nitro-4-pheny-3-(3-pyridyl)coumarin,
6-amino-4-phenyl-3-(3-pyridyl)coumarin, and
6-acetamido-4-phenyl-3-(3-pyridyl)coumarin.

I claim:

1. A compound selected from the group consisting of (1) free base compounds of the formula

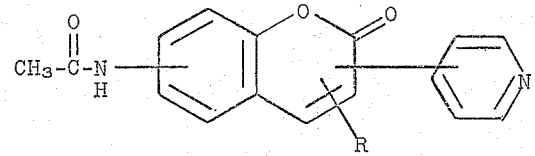

wherein R is selected from the group consisting of hydrogen, alkyl of from 1 to 4 carbon atoms, inclusive, and phenyl; (2) acid addition salts thereof; and (3) N-oxides thereof.

2. 6-acetamido-3-(4-pyridyl)coumarin.

3. A compound selected from the group consisting of (1) free base compounds of the formula

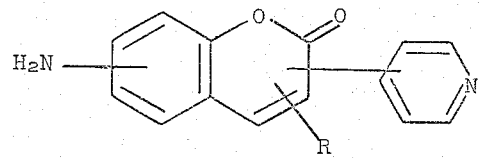

wherein R is selected from the group consisting of hydrogen, alkyl of from 1 to 4 carbon atoms, inclusive, and phenyl; and (2) acid addition salts thereof.

4. 6-amino-3-(4-pyridyl)coumarin.

5. A compound selected from the group consisting of (1) free base compounds of the formula

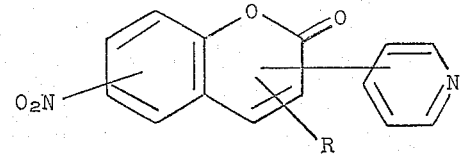

wherein R is selected from the group consisting of hydrogen, alkyl of from 1 to 4 carbon atoms, inclusive, and phenyl; (2) acid addition salts thereof; and (3) N-oxides thereof.

6. 6-nitro-3-(4-pyridyl)coumarin.
7. 6-nitro-3-(2-pyridyl)coumarin.

No references cited.

WALTER A. MODANCE, *Primary Examiner.*
NICHOLAS S. RIZZO, *Examiner.*